(12) United States Patent
Nakata et al.

(10) Patent No.: US 7,313,912 B2
(45) Date of Patent: Jan. 1, 2008

(54) SECONDARY AIR SUPPLY SYSTEM FOR INTERNAL COMBUSTION ENGINE

(75) Inventors: Singo Nakata, Chiryu (JP); Tomoaki Nakano, Nagoya (JP)

(73) Assignee: Denso Corporation, Kariya-city, Aichi-pref. (JP)

( * ) Notice: Subject to any disclaimer, the term of this patent is extended or adjusted under 35 U.S.C. 154(b) by 29 days.

(21) Appl. No.: 11/125,081

(22) Filed: May 10, 2005

(65) Prior Publication Data
US 2005/0274109 A1 Dec. 15, 2005

(30) Foreign Application Priority Data
May 12, 2004 (JP) .............................. 2004-142092

(51) Int. Cl.
*F01N 3/00* (2006.01)
(52) U.S. Cl. ........................ 60/289; 60/277; 60/288; 60/290
(58) Field of Classification Search ............ 60/288, 60/289, 290
See application file for complete search history.

(56) References Cited

U.S. PATENT DOCUMENTS

| | | | |
|---|---|---|---|
| 5,235,956 A * | 8/1993 | Yoshizaki .................. 123/585 |
| 5,615,552 A * | 4/1997 | Shimasaki et al. ............ 60/277 |
| 5,735,121 A * | 4/1998 | Kato et al. ..................... 60/277 |
| 5,921,077 A * | 7/1999 | Bayerle et al. ................ 60/274 |
| 6,192,678 B1 | 2/2001 | Tachibana | |
| 6,829,886 B2 * | 12/2004 | Nakata ......................... 60/277 |
| 7,010,908 B2 * | 3/2006 | Koyama et al. .............. 60/277 |
| 7,114,327 B2 * | 10/2006 | Greim .......................... 60/277 |
| 7,146,803 B2 * | 12/2006 | Streib .......................... 60/289 |
| 7,222,483 B2 * | 5/2007 | Oi et al. ....................... 60/289 |
| 2006/0059898 A1 * | 3/2006 | Wakahara et al. ............ 60/289 |

OTHER PUBLICATIONS

U.S. Appl. No. 11/020,156 to Nakano et al., filed Dec. 27, 2004.

* cited by examiner

*Primary Examiner*—Thomas Denion
*Assistant Examiner*—Loren Edwards
(74) *Attorney, Agent, or Firm*—Nixon & Vanderhye P.C.

(57) ABSTRACT

A secondary air pipe is connected to an exhaust pipe upstream of a catalyst, and a secondary air pump is connected to an upstream portion of the secondary air pipe. An ECU determines an operating period of the secondary air pump before the secondary air pump is operated in order to drive the secondary air pump within the operating period. Especially, the ECU detects a pump driving load during a secondary air supply to correct the operating period of the secondary air pump based on the detected pump driving load.

8 Claims, 7 Drawing Sheets

SECONDARY AIR SUPPLY SYSTEM FOR INTERNAL COMBUSTION ENGINE

CROSS REFERENCE TO RELATED APPLICATIONS

This application is based on Japanese Patent Application No. 2004-142092 filed on May 12, 2004, the disclosure of which is incorporated herein by reference.

FIELD OF THE INVENTION

The present invention relates to a secondary air supply system for an internal combustion engine.

BACKGROUND OF THE INVENTION

An exhaust pipe of an internal combustion engine is provided with an exhaust gas purifying apparatus such as a catalyst for purifying exhaust gas. It is known that a secondary air supply apparatus such as an air pump is provided upstream of the exhaust gas purifying apparatus in order to supply secondary air into the exhaust pipe.

A DC motor, for example, drives the air pump. A temperature of the whole pump, which is referred to as a pump temperature hereinafter, increases according as an operation period of the pump elapses. Thus, a long period operation of the air pump excessively increases the pump temperature, so that the air pump may receive damages and/or a lifetime of the air pump is reduced. In order to overcome these problems, the operation period of the air pump is predetermined and the air pump is operated within the predetermined period.

In a secondary air supply apparatus shown in JP-2000-240434A, it is determined whether a non-operating period of the internal combustion engine is short based on a difference in a temperature of coolant between at a time when the internal combustion engine is stopping and a time when the internal combustion engine is restarting. When it is determined the non-operating period is short, the operation period of the air pump is corrected according to a difference in temperature between coolant and an intake air at the time when the internal combustion engine is restarted.

However, in the above prior art, although the pump operating period is determined based on the temperature conditions before the air pump is started to be driven, the air pump is submissively driven until the predetermine period has elapsed. Thus, even if an operating condition of the air pump is varied during the operating period, the operating period cannot be adjusted. When the operation condition of the air pump is changed into a high load condition, a load of the air pump is increased compared with a normal load operation, so that damages to the air pump and/or a reduction of lifetime of the air pump are arouse.

SUMMARY OF THE INVENTION

It is a primal object of the present invention to provide a secondary air supply system for an internal combustion engine which is able to restrain the secondary air supply apparatus from being damaged and is able to properly drive the secondary air supply apparatus.

According to the present invention, an operating period of the secondary air supply apparatus is predetermined before the secondary air supply apparatus is operated, in order to drive the secondary air supply apparatus within the operating period. Especially, an operation condition of the secondary air supply apparatus is detected during its operation period in order to correct the operation period of the secondary air supply apparatus based on the operating condition. According to this structure, the operating period of the secondary air supply apparatus is suitably adjusted. Thus, even if the operation condition of the secondary air supply apparatus is varied during its operation, the secondary air supply apparatus including an air pump can be suitably operated according to a change of the operation condition and is restrained from being damaged.

DETAILED DESCRIPTION OF EMBODIMENT

First Embodiment

Figure 1:
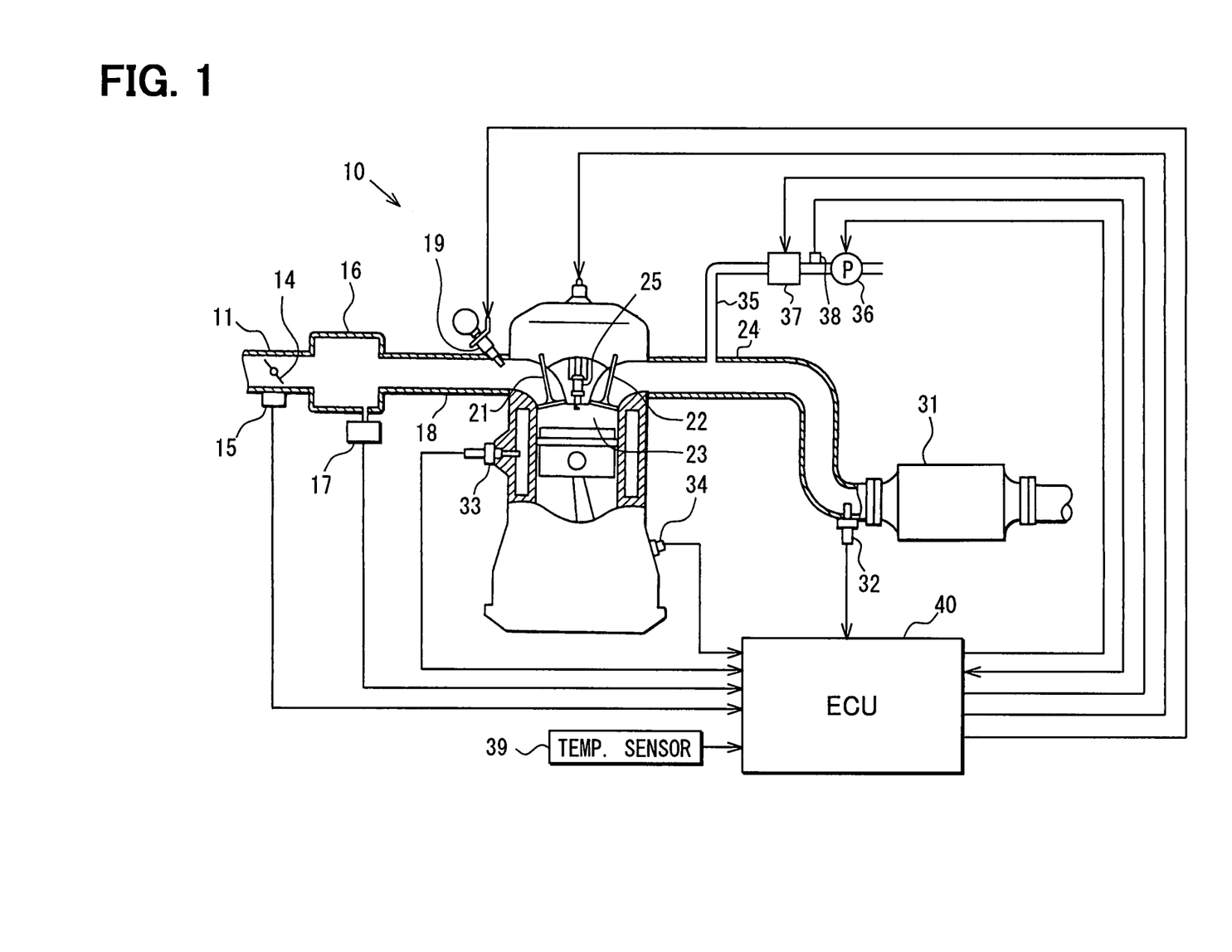
FIG. 1 is a schematic view of an engine control system according to an embodiment of the present invention.

A first embodiment of the present invention will be described hereinafter with reference to the drawings. In this embodiment, a secondary air supply apparatus is applied to a gasoline engine. An electric control unit (which is referred to as an ECU hereinafter) conducts a fuel injection control and an ignition control. Referring to FIG. 1, a structure of an engine control system is described.

In an engine 10 shown in FIG. 1, a throttle valve 14 of which opening is adjusted by an actuator such as a DC motor is provided in an intake pipe 11, and a throttle position sensor 15 detecting a position of the throttle valve is provided. A surge tank 16 is provided downstream of the throttle valve 14, and an intake air pressure sensor 17 for detecting an intake air pressure is provided in the surge tank 16. An intake manifold 18 is connected to the surge tank 16 in order to introduce the intake air into cylinders of the engine 10. A fuel injector 19, which is electromagnetically actuated, is mounted in the intake manifold 18 at a vicinity of an intake port of each cylinder.

An intake valve 21 and an exhaust valve 22 are respectively provided on an intake port and an exhaust port of the engine 10. When the intake valve 21 is opened, air-fuel mixture is introduced into a combustion chamber 23. When the exhaust valve 22 is opened, exhaust gas in the combustion chamber 23 is expelled into an exhaust pipe 24. A spark plug 25 is mounted on a cylinder head of the engine 10 to each cylinder. The spark plug 25 receives high voltage through an ignition apparatus (not shown) including an ignition coil at a predetermined ignition timing. The high voltage applied to the spark plug 25 causes a spark between confronting electrodes of the spark plug 25 to ignite air-fuel mixture in the combustion chamber 23.

A catalyst 31 such as a three-way catalyst is provided in the exhaust pipe 24 in order to purify CO, HC, $NO_x$ and the like in the exhaust gas. An air-fuel ratio sensor 32 (a linear A/F sensor, an $O_2$ sensor, and the like) is provided upstream of the catalyst 31 in order to detect air-fuel ratio of the air-fuel mixture. A water temperature sensor 33 detecting a temperature of coolant and a crank angle sensor 34 outputting pulse crank angle signals every predetermined angle (for example, 30° CA) are mounted on the cylinder block of the engine 10. An intake air temperature sensor 39 detecting a temperature of intake air is provided in an air cleaner at an upstream portion of the intake pipe.

A secondary air pipe 35 is connected to the exhaust pipe 24 upstream of the catalyst 31, and a secondary air pump 36 is connected to an upstream portion of the secondary air pipe 35. The secondary air pump 36 and the secondary air pipe 35 constitute a secondary air supply system. The secondary air pump 36 is, for example, a DC motor and is driven receiving electrical current from an onboard battery (not shown). A switching valve 37 is provided downstream of the secondary air pump 36 in order to open/close the secondary air pipe 35. A pressure sensor 38 detecting a pressure in the secondary air pipe 35 is provided between the secondary air pump 36 and the switching valve 37.

The outputs from the above sensors are inputted into the ECU 40 executing an engine control. The ECU 40 includes a microcomputer comprised of CPU, ROM, RAM and the like. By executing control programs stored in the ROM, a fuel injection amount by the fuel injector 19 and ignition timing by the spark plug 25 are controlled. The ECU 40 drives the secondary air pump 36 to conduct a secondary air supply so that the catalyst 31 is promptly activated at the time of engine starting.

Figure 2:
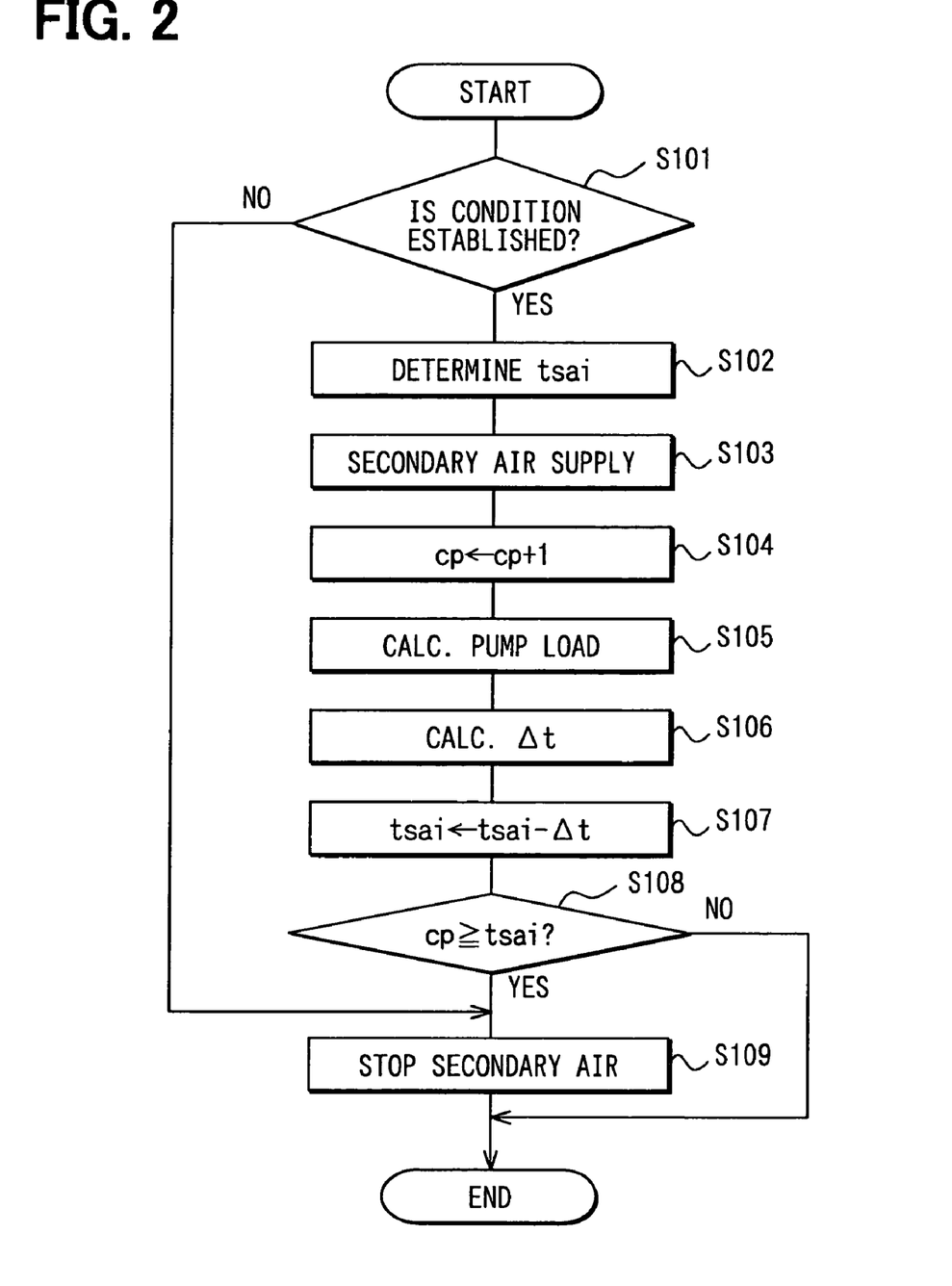
FIG. 2 is a flowchart showing a secondary air supply process.

Referring to FIG. 2, procedures of the secondary air supply process are described. The procedures shown in FIG. 2 are executed in a predetermined time interval.

In step S101, a determination is made as to whether a secondary air supply condition is established. For example, it is determined that the secondary air supply condition is established when it is in an early period since the engine is started and when the coolant temperature is still within a predetermined range. When the secondary air supply condition is established, the procedure proceeds to step S102 to execute following steps for secondary air supply into the exhaust pipe 24. When the secondary air supply condition is not established, the procedure proceeds to step S109 to stop the secondary air supply.

Figure 3:
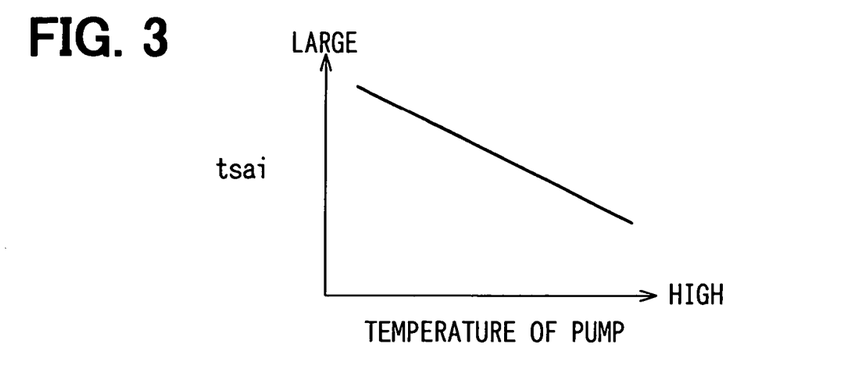
FIG. 3 is a graph showing a relationship between a pump temperature and an acceptable operating period of the pump.

In step S102, an acceptable operating period "tsai" of the secondary air pump 36 is determined. In this embodiment, the pump temperature is estimated to determine the acceptable operating period "tsai". The estimated pump temperature is a pump temperature at the time when the secondary air pump 36 is started. Specifically, an engine coolant temperature Tw detected by the water temperature sensor 33 and an intake air temperature Ta detected by an intake air temperature sensor 39 are inputted to select the higher value between them as the pump temperature. Then, according to a relationship shown in FIG. 3, the acceptable operating period "tsai" corresponding to the pump temperature is derived. As shown in FIG. 3, the higher the pump temperature is, the shorter the acceptable operating period "tsai" is, and the lower the pump temperature is, the longer the acceptable operating period "tsai" is.

In step S103, the switching valve 37 is opened and the secondary air pump 36 is driven to start the secondary air supply. The processes in step S102 and S103 need to be executed only once at the time of beginning of the secondary air supply. Actually, these processes are not executed after first routine is conducted.

In step S104, an operating period counter "cp" counts up the pump operating period after the secondary air supply is started (cp=previous cp+1).

Figure 4:
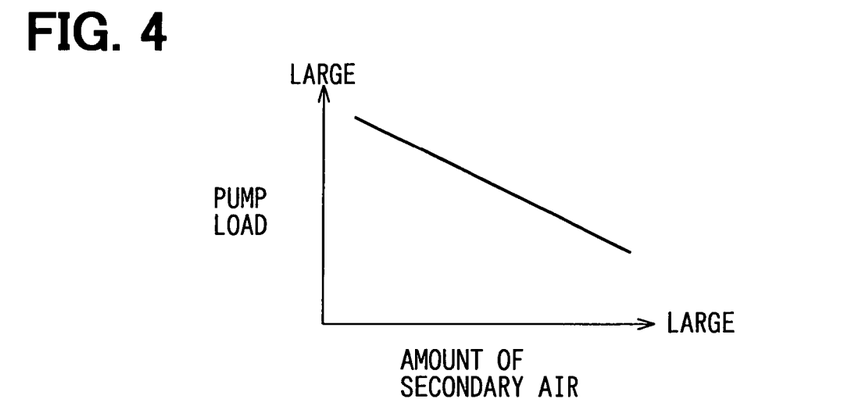
FIG. 4 is a graph showing a relationship between an amount of secondary air and a pump load.

In step S105, a driving load of the secondary air pump 36 is calculated. In the present embodiment, the pump driving load is derived according to the amount of the secondary air with reference to FIG. 4. That is, an increment in exhaust gas pressure based on an increment of the amount of intake air into the engine 10 increases the pressure in the secondary air pipe 35, so that the pump driving load is increased. At this time, since the amount of the secondary air decreases, the pump driving load can be calculated based on the calculated value of the amount of secondary air.

The amount of the secondary air is calculated based on a detected value (secondary air supply pressure Ps) by the pressure sensor 38 when the switching valve 27 is opened and the secondary air pump 36 is operated. In the present embodiment, the amount of secondary air is calculated based on a pressure difference between the secondary air supply pressure Ps and a reference pressure in order to restrict a deterioration of calculating accuracy due to a product tolerance of the secondary air pump 36 and the pressure sensor 38. For example, when the switching valve 37 is closed and the secondary air pump 36 is operated, a shutoff pressure P0 as the reference pressure is detected to calculate the secondary air flow rate Qa according to a following equation (1).

$$Qa = CA\sqrt{\frac{2}{\rho}(P0 - Ps)} \qquad (1)$$

In the equation (1), "$\rho$" represents fluid density, "C" represent coefficient, and "A" represents cross sectional area of the pipe. Since the flow density $\rho$ has thermal characteristics, the flow density $\rho$ can be corrected according to a temperature of intake air.

Figure 5:
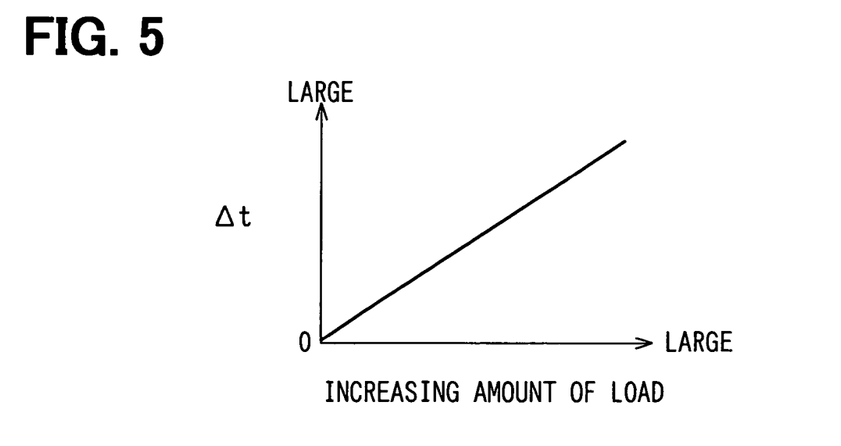
FIG. 5 is a graph showing a relationship between an increasing amount of load and a correction amount of operating period.

In step S106, an operating period correction amount $\Delta t$ is calculated based on the current pump driving load. At this time, an increasing amount of driving load from an ordinary load (a reference load) is calculated. The operating period correction amount $\Delta t$ is made larger according as the increasing amount of driving load becomes larger based on the relationship shown in FIG. 5. In step S107, the acceptable operating period "tsai" is corrected by subtracting the operating period correction amount $\Delta t$ ("tsai"=previous "tsai"−$\Delta t$).

In step S108, a determination is made as to whether the value of the counter "cp" is greater than or equal to the acceptable operating period "tsai". When "cp" is lower than "tsai" (cp<tsai), the procedure ends, whereby the secondary air supply is continued. When "cp" is greater than or equal to "tsai" (cp≧tsai), the procedure proceeds to step S109 to close the switching valve 37 and stop the secondary air pump 36, whereby the secondary air supply is terminated.

Figure 6:
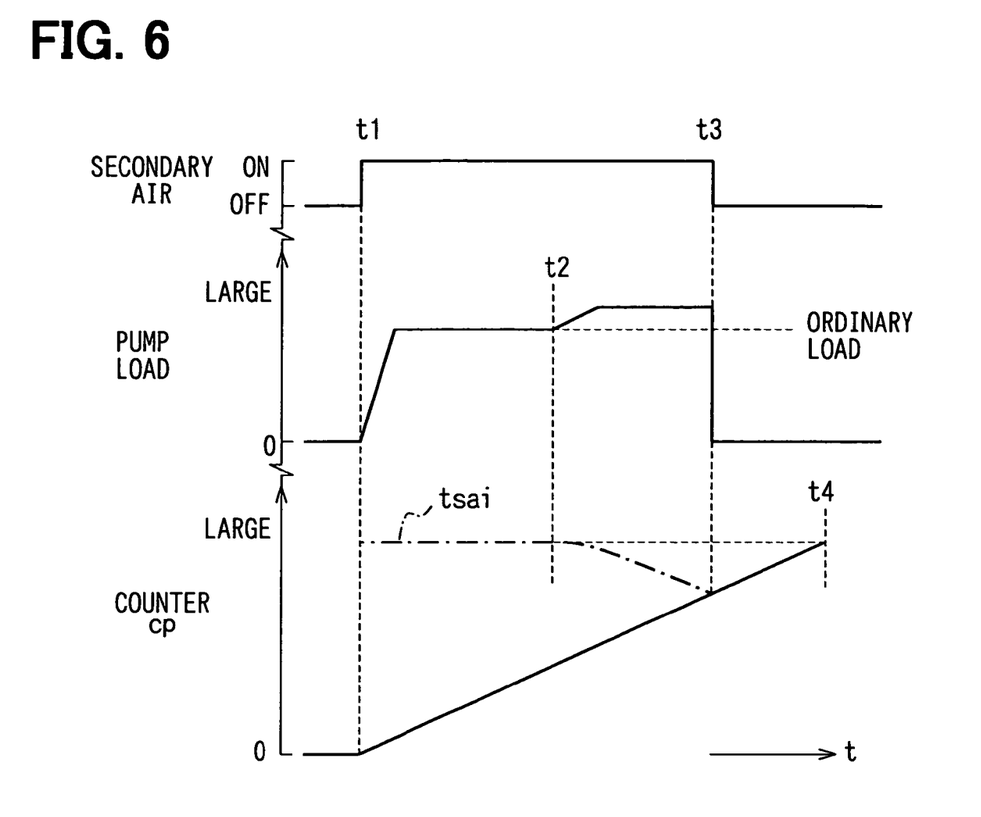
FIG. 6 is a time chart showing the secondary air supply process.

FIG. 6 is a time chart specifically showing the secondary air supply processes. FIG. 6 shows on-off operation of the secondary air supply, a variation of the pump driving load, and a variation of the operating period counter "cp". The acceptable operating period "tsai" is indicated by a dashed line.

When the secondary air supply is started at the time of t1, the acceptable operating period "tsai" is initially determined and the operating period counter "cp" starts to count up. After the time of t1, the driving load of the pump is increased and is maintained on an ordinary load level. At this moment, under the condition in which the pump driving load is maintained on the ordinary load level, the acceptable operating period "tsai" is not subtractively corrected to be maintained as an initially determined value.

When the pump driving load is increased at the time of t2 due to an increment in intake air flow rate (increment in exhaust pressure), the acceptable operating period "tsai" is subtractively corrected according to an increasing amount from the ordinary driving load level. Then, at the time of t3 in which the value of the operating period counter "cp" reaches the acceptable operating period "tsai", the secondary air supply is terminated.

Unless the acceptable operating period "tsai" is subtractively corrected, the secondary air supply terminates at the time of t4 in which the value of the operating period counter "cp" reaches the initially determined acceptable operating period "tsai" (conventional system). According to the present embodiment, since the acceptable operating period "tsai" is subtracted, the secondary air supply is terminated at the time of t3. Therefore, even if the pump driving load is increased during the secondary air supply, it is restricted that the over load is applied to the secondary air pump 36 to reduce the lifetime thereof.

As described above, although the operating period of the secondary air pump 36 is reduced due to the increment in intake air flow rate, the catalyst 31 can be warmed up rapidly to avoid a failure of warming-up of the catalyst 31. That is, from a viewpoint of the warming-up of the catalyst 31, when the intake air flow rate is constant, the time of t4 corresponds to a time in which the warming-up of the catalyst 31 is completed. When the intake air flow rate is increased, the time of t3 corresponds to a time in which the warming-up of the catalyst 31 is completed. Since the operating period of secondary air pump 36 is reduced as described above, the secondary air supply can be conducted according to a required warming-up period of the catalyst 31.

According to the present embodiment, since the acceptable operating period "tsai" is subtractively corrected according to the pump load of the secondary air pump 36 during its operation, even if the pump driving load is varied after the secondary air supply is started, the secondary air pump 36 can be operated according to the variation of the load. Thus, it is possible to protect the secondary air pump 36 from damages.

Since the secondary air flow rate Qa, which is used as a parameter for calculating the pump driving load, is calculated based on the pressure difference between the secondary air supply pressure Ps and the shutoff pressure P0, the secondary air flow rate Qa is precisely calculated without being affected by a fluctuation in atmospheric pressure, product tolerances of the secondary air pump 36 and the pressure sensor 38, pressure loss in the secondary air pipe 35, and the like. Thus, the pump driving load is precisely obtained to drive the secondary air pump 36 is a proper manner.

Since the pump temperature is estimated as a pre-operating condition of the secondary air pump 36, and the acceptable operating period "tsai" is determined based on the estimated pump temperature, it is further possible to protect the secondary air pump 36 from damages.

Second Embodiment

In the first embodiment, the operating period correction amount Δt is sequentially calculated according to the increasing amount of the pump driving load (differential amount from the ordinal pump driving load), and then the acceptable operating period "tsai" is subtractively corrected based on the correction amount Δt. According to a second embodiment, the acceptable operating period "tsai" is subtractively corrected only when the pump driving load exceeds a predetermined reference value.

Figure 7:
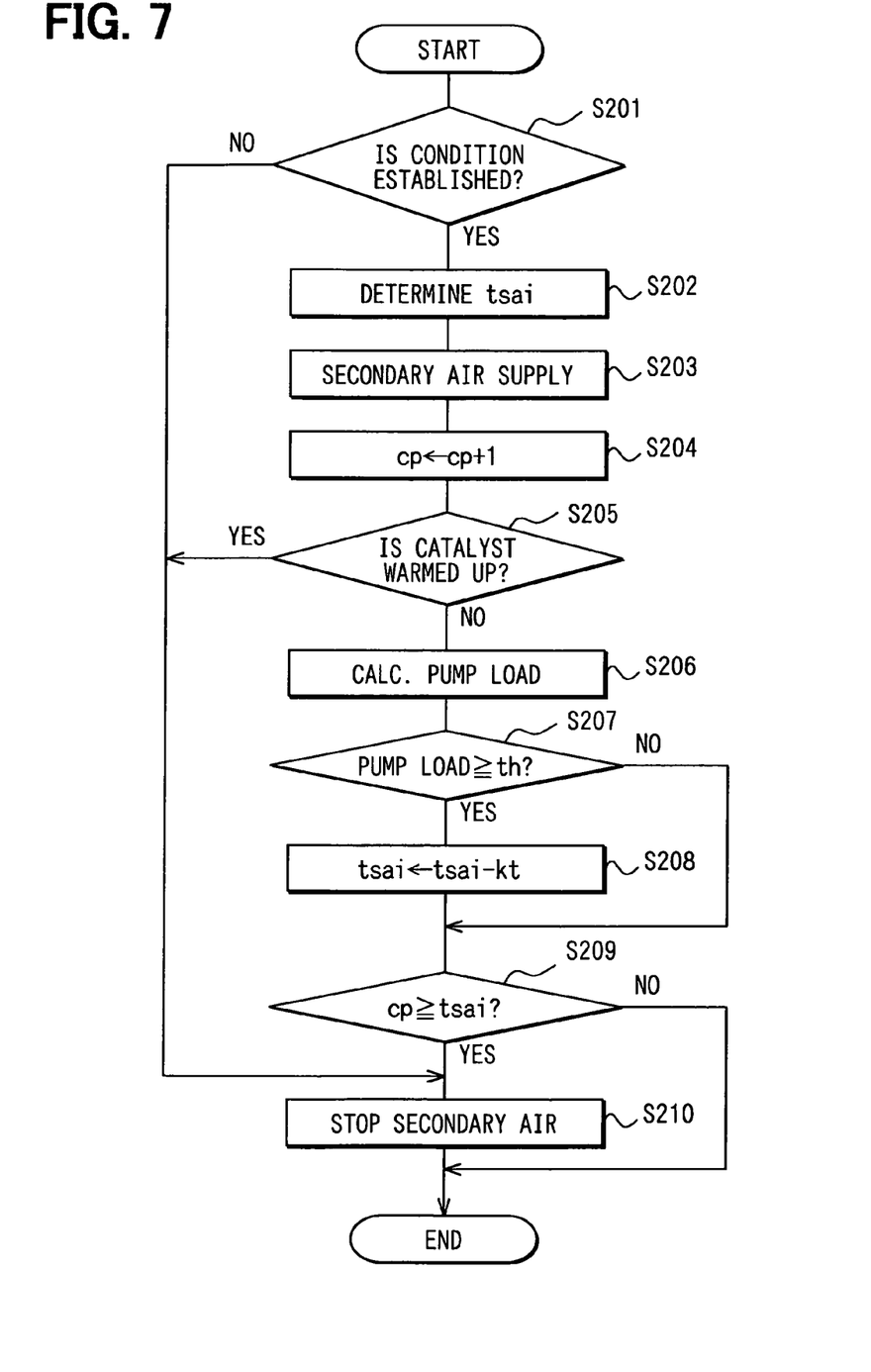
FIG. 7 is a flow chart sowing a secondary air supply process according to a second embodiment of the present invention.

FIG. 7 is a flowchart showing a secondary air supply process in a second embodiment. This flowchart is executed by the ECU 40 instead of the flowchart shown in FIG. 2. In the processes shown in FIG. 7, the same process as those in FIG. 2 is simply described.

In step S201 to S204, when the secondary air supply condition is established, the acceptable operating period "tsai" is determined, the secondary air supply is started, and the operating period counter "cp" counts up the pump operating period (these are the same as step S101 to S104 in FIG. 2).

In step 205, a determination is made as to whether the warming-up of the catalyst 31 is completed. When an integrated value of intake air flow rate from engine starting reaches a predetermined value, it is determined that the warming-up of the catalyst 31 is completed. When the warming-up of the catalyst has been completed, the procedure proceeds to step S210 to terminate secondary air supply. When the warming-up of the catalyst has not been completed yet, the procedure proceeds to step S206 in which a pump driving load of the secondary air pump 36 is calculated (it is the same as step S105 in FIG. 2).

In step S207, a determination is made as to whether the calculated pump driving load is greater than or equal to a predetermined value "th". When the pump driving load is greater than or equal to the value "th", the procedure proceeds to step S208 in which the acceptable operating period "tsai" is subtractively corrected by a predetermined value "kt" (tsai=previous tsai−kt).

In step S209, a determination is made as to whether the value of the operating period counter "cp" is greater than or equal to the acceptable operating period "tsai". When "cp" is less than "tsai" (cp<tsai), the procedure ends, whereby the secondary air supply is continued. When "cp" is greater than or equal to "tsai" (cp≧tsai), the procedure proceeds to step S210 in which the switching valve 37 is closed and the secondary air pump 36 is stopped, whereby the secondary air supply is terminated.

Figure 8:
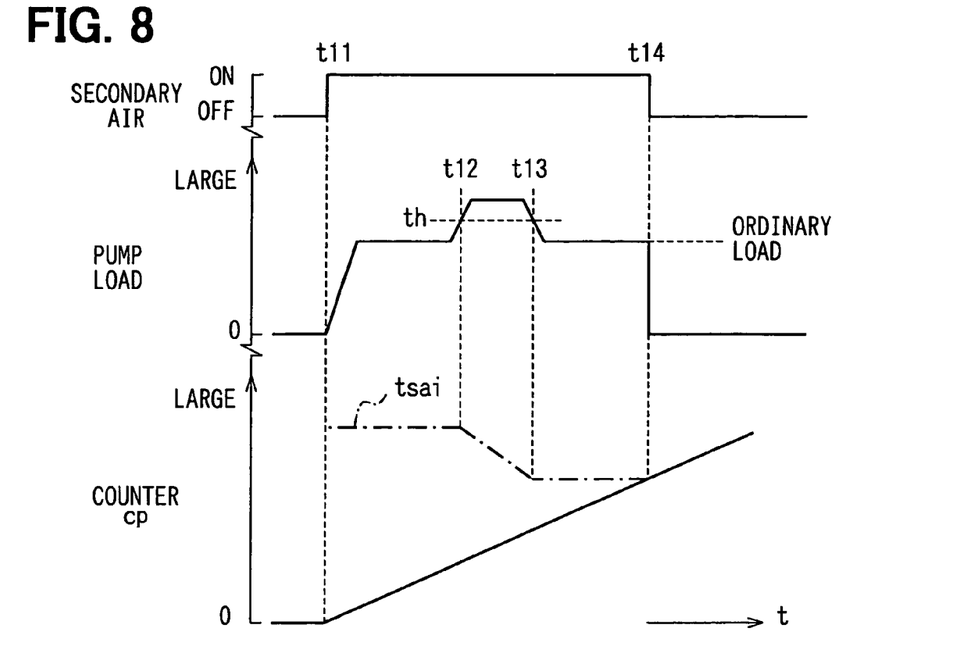
FIG. 8 is a time chart showing a secondary air supply process.

FIG. 8 is a time chart specifically showing the secondary air supply process. FIG. 8 shows on-off operation of the secondary air supply, a variation of the pump driving load, and a variation of the operating period counter "cp". The acceptable operating period "tsai" is indicated by a dashed line.

When the secondary air supply is started at the time of t11, the acceptable operating period "tsai" is initially determined and the operating period counter "cp" starts to count up.

After the time of t11, the driving load of the pump is increased and is maintained on an ordinary load level. At this moment, under the condition in which the pump driving load is maintained on the ordinary load level, the acceptable operating period "tsai" is not subtractively corrected to be maintained as an initially determined value.

After that, the pump driving load is increased due to the increment in intake air flow rate (increment in exhaust gas pressure), and the acceptable operating period "tsai" is subtractively corrected during a period from the time of t12 to the time of t13 in which the pump driving load exceeds the predetermined value "th". At the time of t14 in which the value of the operating period counter "cp" reaches the acceptable operating period "tsai", the secondary air supply is terminated.

According to the second embodiment, even if the pump driving load is varied after the secondary air supply is started, the secondary air pump 36 can be operated according to the variation of the load as well as the first embodiment. Thus, it is possible to protect the secondary air pump 36 from damages.

The present invention is not limited to the above embodiments but applied to another embodiment as described below.

In the first embodiment, an ordinary load level+α(α>0) may be set as a dead-band. When the pump driving load exceeds the dead band, the acceptable operating period "tsai" may be subtractively corrected according to the current increasing amount of the pump driving load.

In the second embodiment, only one predetermined reference value "th" is provided. Two predetermined reference values may be provided.

In the above embodiments, the acceptable operating period "tsai" is subtractively corrected to reduce the operating period of the secondary air pump 36. Instead of these, the value of the operating period counter "cp" may be corrected to reduce the operating period of the secondary air pump 36. An explanation will be made based on a time charts shown in FIGS. 9 and 10.

Figure 9:
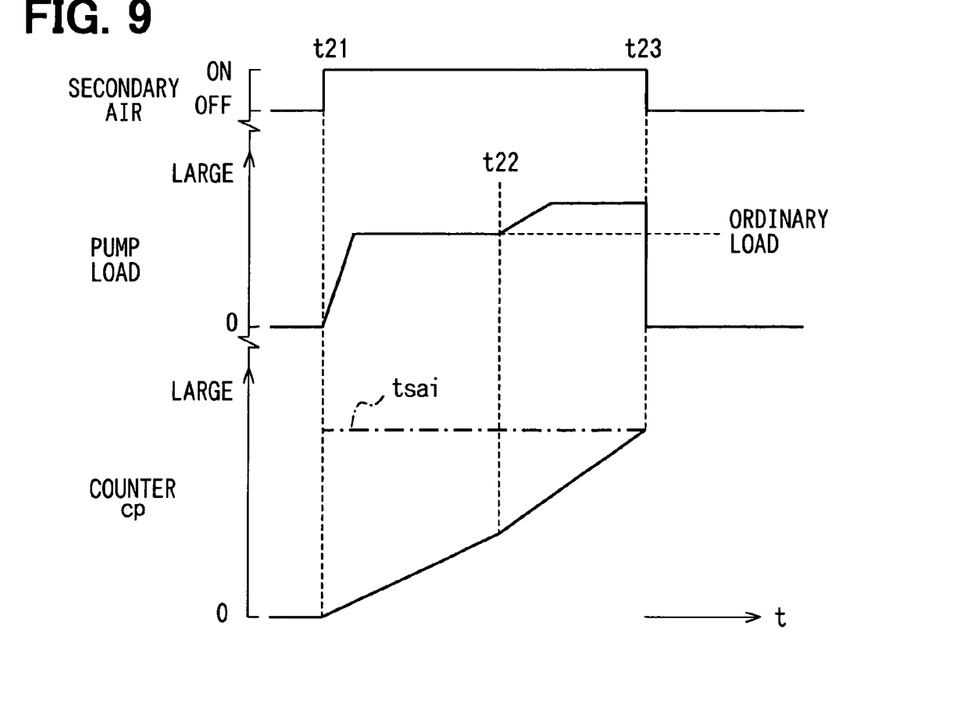
FIG. 9 is a time chart showing a secondary air supply process.

When the secondary air supply is started at the time of t21 in FIG. 9, the acceptable operating period "tsai" is initially determined and the operating period counter "cp" starts to count up. After the time of t21, the driving load of the pump is increased and is maintained on an ordinary load level. At this moment, under the condition in which the pump driving load is maintained on the ordinary load level, the value of the operating period counter "cp" is not corrected but increases by a predetermined value.

When the pump driving load is increased at the time of t22 due to an increment in intake air flow rate (increment in exhaust pressure), the acceptable operating period "tsai" is maintained as the initially determined value, and the value of the operating period counter "cp" is addingly corrected according to an increasing amount from the ordinary driving load level. Then, at the time of t23 in which the value of the operating period counter "cp" reaches the acceptable operating period "tsai", the secondary air supply is terminated.

Figure 10:
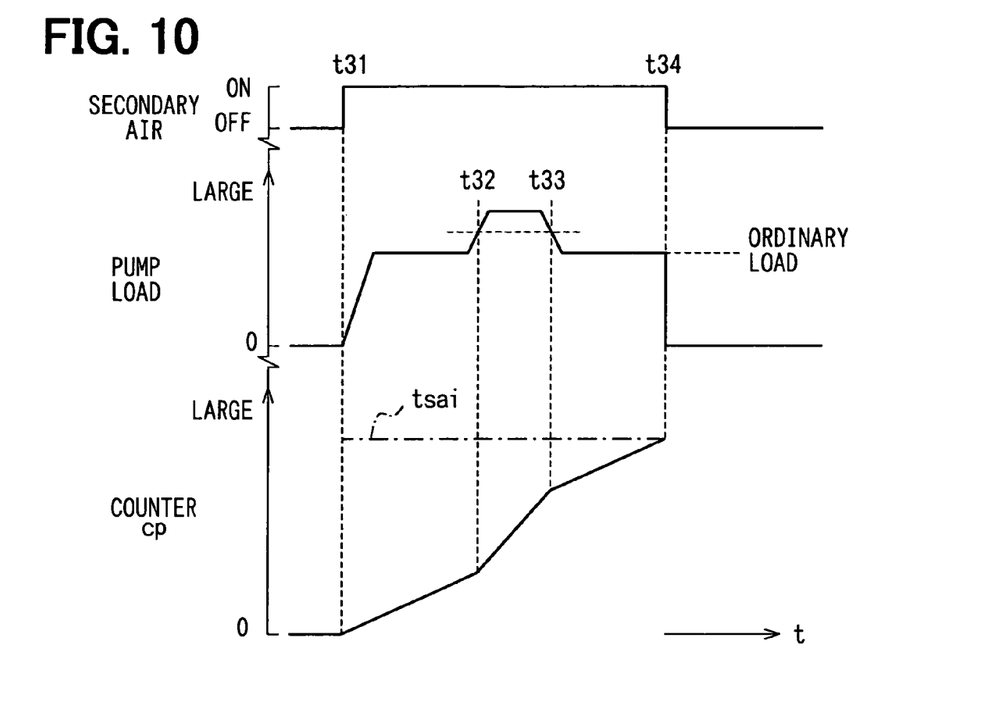
FIG. 10 is a time chart showing a secondary air supply process.

In FIG. 10, when the secondary air supply is started at the time of t31, the acceptable operating period "tsai" is initially determined and the operating period counter "cp" starts to count up. After the time of t31, the driving load of the pump is increased and is maintained on an ordinary load level. At this moment, under the condition in which the pump driving load is maintained on the ordinary load level, the value of the operating period counter "cp" is not corrected but increases by a predetermined value.

After that, the pump driving load is increased due to the increment in intake air flow rate (increment in exhaust gas pressure), the acceptable operating period "tsai" is maintained as the initially determined value, and the operating period counter "cp" is addingly corrected during a period from the time of t32 to the time of t33 in which the pump driving load exceeds the predetermined value "th". At the time of t34 in which the value of the operating period counter "cp" reaches the acceptable operating period "tsai", the secondary air supply is terminated.

In the embodiments shown in FIGS. 9 and 10, the operating period of the secondary air pump 36 is precisely corrected to protect the secondary air pump 36 from damages as well as the first and the second embodiment.

In the above embodiments, the pressure sensor 38 is provided in the secondary air pipe 38 to calculate the secondary air flow rate based on the detected value of the pressure sensor 38. Instead of these structures, the secondary air pipe 35 may be provided with a flow rate sensor to calculate the secondary air flow rate based on the detected value by the flow rate sensor.

Figure 11A:
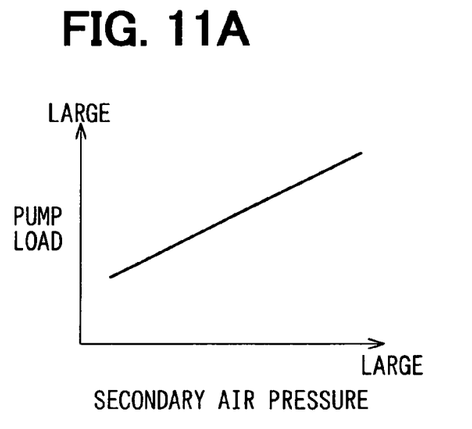
FIG. 11A is a graph showing a relationship between a secondary air pressure and a pump load.
Figure 11B:
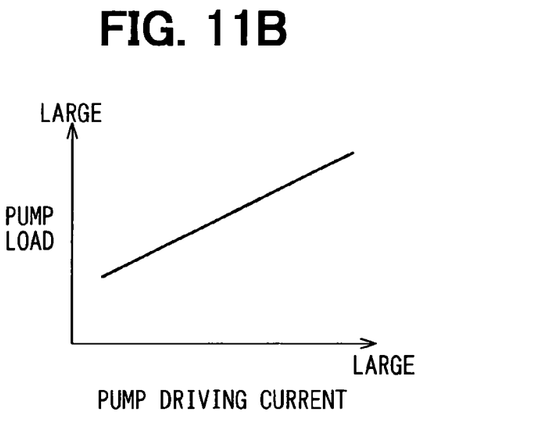
FIG. 11B is a graph showing a relationship between a pump driving current and a pump load.

In the above embodiments, the pump driving load is calculated according to the secondary air flow rate during the air pump operation. Such a structure may be changed as described below. According as the pressure in the exhaust pipe 24 increases due to the increment in intake air flow rate, the pressure in the secondary air pipe 35 is increased to increase the pump driving load. According to a relationship shown in FIG. 11A, the pump driving load is calculated based on a secondary air pressure detected by the pressure senor 38. Alternatively, a pump driving current is measured in a driving circuit of the secondary air pump 36 with an ammeter. According to a relationship shown in FIG. 11B, the pump driving load is calculated based on the pump driving current.

The pump driving load can be calculated according to a differential pressure (P0-Ps) between the shutoff pressure P0 and the secondary air supply pressure Ps. The larger the differential pressure (P0-Ps) is, the smaller the pump driving load is.

In the above embodiments, the higher value between the engine coolant temperature Tw and the intake air temperature Ta is estimated as the pump temperature before its operation, and the acceptable operating period "tsai" is calculated based on the pump temperature. Such a structure can be changed. For example, the pump temperature before its operation is estimated according to an elapsed time period since a previous pump stopping. The acceptable operating period "tsai" may be calculated according to the estimated pump temperature. The acceptable operating period "tsai" can be a predetermined fixed value.

What is claimed is:

1. A secondary air supply system including a secondary air supply apparatus for supplying a secondary air into an exhaust passage of the internal combustion engine, the secondary air supply apparatus being operated within an operating period which is determined before the secondary air supply apparatus starts to be operated, the system comprising:

a condition detecting means for detecting a driving load of the secondary air supply apparatus during its operation;

a correction means for correcting the operating period of the secondary air supply apparatus based on the driving load of the secondary air supply apparatus, a pressure detecting means for detecting a pressure in a secondary air passage communicating to the exhaust passage, wherein the condition detecting means includes a calculation means which calculates the driving load based on the pressure in the secondary air passage detected by the pressure detecting means under a condition of a secondary air supply.

2. The secondary air supply system according to claim 1 wherein:
when the driving load of the secondary air supply apparatus detected by the condition detecting means is larger than a predetermined reference load, the correction means corrects the operating period of the secondary air supply apparatus based on a difference between the driving load and the predetermined reference load.

3. The secondary air supply system according to claim 1 wherein
the operating period is determined based on a pre-operating condition of the secondary air supply apparatus.

4. A secondary air supply system including a secondary air supply apparatus for supplying a secondary air into an exhaust passage of the internal combustion engine, the secondary air supply apparatus being operated within an operating period which is determined before the secondary air supply apparatus starts to be operated, the system comprising:
a condition detecting means for detecting a driving load of the secondary air supply apparatus during its operation;
a correction means for correcting the operating period of the secondary air supply apparatus based on the driving load of the secondary air supply apparatus,
a pressure detecting means for detecting a pressure in a secondary air passage communicating to the exhaust passage,
wherein the condition detecting means includes a calculation means which calculates the driving load based on the pressure in the secondary air passage detected by the pressure detecting means under a condition of a secondary air supply and a reference pressure detected by the pressure detecting means under another condition other than the condition of the secondary air supply.

5. The secondary air supply system according to claim 4 wherein:
when the driving load of the secondary air supply apparatus detected by the condition detecting means is larger than a predetermined reference load, the correction means corrects the operating period of the secondary air supply apparatus based on a difference between the driving load and the predetermined reference load.

6. The secondary air supply system according to claim 4 wherein
the operating period is determined based on a pre-operating condition of the secondary air supply apparatus.

7. A method for supplying secondary air into an exhaust passage of an internal combustion engine within an operating period which is determined before secondary air supply is started, the method comprising:
detecting a driving load of a secondary air supply apparatus during its operation;
correcting the operating period of the secondary air supply apparatus based on the detected driving load;
detecting pressure in a secondary air passage communicating to the exhaust passage,
wherein detecting the driving load includes calculating the driving load based on the detected pressure in the secondary air passage under a condition of secondary air supply.

8. A method for supplying secondary air into an exhaust passage of an internal combustion engine within an operating period which is determined before secondary air supply is started, the method comprising:
detecting a driving load of a secondary air supply apparatus during its operation;
correcting the operating period of the secondary air supply apparatus based on the detected driving load;
detecting pressure in a secondary air passage communicating to the exhaust passage;
wherein detecting the driving load includes calculating the driving load based on the detected pressure in the secondary air passage under a condition of secondary air supply and a detected reference pressure under another condition other than secondary air supply.

* * * * *